United States Patent
Ehinger

(10) Patent No.: US 10,371,212 B2
(45) Date of Patent: Aug. 6, 2019

(54) BEARING LINER FOR ACCOMMODATING THERMAL EXPANSION AND TRANSMISSION SYSTEM INCORPORATING THE SAME

(71) Applicant: Bell Helicopter Textron, Inc., Fort Worth, TX (US)

(72) Inventor: Ryan Thomas Ehinger, Southlake, TX (US)

(73) Assignee: Bell Helicopter Textron, Inc., Fort Worth, TX (US)

( * ) Notice: Subject to any disclaimer, the term of this patent is extended or adjusted under 35 U.S.C. 154(b) by 295 days.

(21) Appl. No.: 15/375,131

(22) Filed: Dec. 11, 2016

(65) Prior Publication Data

US 2018/0163777 A1    Jun. 14, 2018

(51) Int. Cl.
| | | |
|---|---|---|
| B64C 27/12 | (2006.01) | |
| F16C 19/52 | (2006.01) | |
| F16C 35/077 | (2006.01) | |
| F16C 33/30 | (2006.01) | |
| F16C 33/62 | (2006.01) | |
| F16C 19/06 | (2006.01) | |

(52) U.S. Cl.
CPC ............ *F16C 35/077* (2013.01); *B64C 27/12* (2013.01); *F16C 19/525* (2013.01); *F16C 33/303* (2013.01); *F16C 33/62* (2013.01); *F16C 19/06* (2013.01); *F16C 2202/22* (2013.01); *F16C 2204/52* (2013.01); *F16C 2226/60* (2013.01); *F16C 2326/43* (2013.01)

(58) Field of Classification Search
CPC .. F16C 19/525; F16C 19/2527; F16C 35/067; F16C 35/077; F16C 2326/43
See application file for complete search history.

(56) References Cited

U.S. PATENT DOCUMENTS

| | | | | |
|---|---|---|---|---|
| 3,912,347 A | * | 10/1975 | Pflugner | F16C 35/067 384/585 |
| 4,772,139 A | | 9/1988 | Bretton | |
| 4,804,277 A | * | 2/1989 | Counoupas | F16C 35/067 384/493 |
| 6,302,356 B1 | | 10/2001 | Hawkins | |
| 8,047,719 B2 | * | 11/2011 | Yuan | F16C 35/077 384/438 |
| 10,001,174 B2 | * | 6/2018 | Ishibashi | F16C 35/067 |
| 2011/0030503 A1 | | 2/2011 | Ehinger et al. | |

* cited by examiner

*Primary Examiner* — James Pilkington
(74) *Attorney, Agent, or Firm* — Lightfoot & Alford PLLC

(57) ABSTRACT

A bearing liner allows a bearing to be mounted to a bearing housing even where the coefficients of thermal expansion of the bearing and the housing are different. The bearing liner includes a body portion and a mounting portion. The body portion has a cylindrical substrate that extends about a longitudinal axis of the bearing. The mounting portion includes mounting tabs that extend from the body portion of the liner. The mounting tabs allow the liner to be fixed to the housing and to the bearing. The mounting tabs are configured to flex relative to the body portion of the liner so as to allow for thermal expansion and contraction of the housing relative to the bearing while still securing the bearing to the housing.

14 Claims, 7 Drawing Sheets

BEARING LINER FOR ACCOMMODATING THERMAL EXPANSION AND TRANSMISSION SYSTEM INCORPORATING THE SAME

TECHNICAL FIELD

This disclosure generally relates to bearing liners, and more specifically relates to bearing liners that are capable of accommodating differential thermal expansion in bearings and housings, including bearings used in aircraft transmission systems.

SUMMARY

A bearing liner is disclosed as comprising a body portion having a cylindrical substrate that extends about a longitudinal axis, the cylindrical substrate having an inner surface and an outer surface, and the cylindrical substrate extending between first and second sides thereof. The bearing liner further comprises a first mounting tab extending from the body portion, the first mounting tab including a first mounting portion and a second mounting tab extending from the body portion, the second mounting tab including a second mounting portion. A center line of the body portion that is orthogonal to the longitudinal axis extends through the first and second mounting portions on opposite sides of the body portion. The first and second mounting tabs extend from a same side of the center line of the body portion. At least one of the first and second mounting tabs is configured to arcuately flex relative to the body portion so as to allow for thermally-induced movement of the first and second mounting portions relative to the body portion.

BRIEF DESCRIPTION OF THE DRAWINGS

Embodiments are illustrated by way of example in the accompanying figures, in which like reference numbers indicate similar parts, and in which.

DETAILED DESCRIPTION

Figure 1:
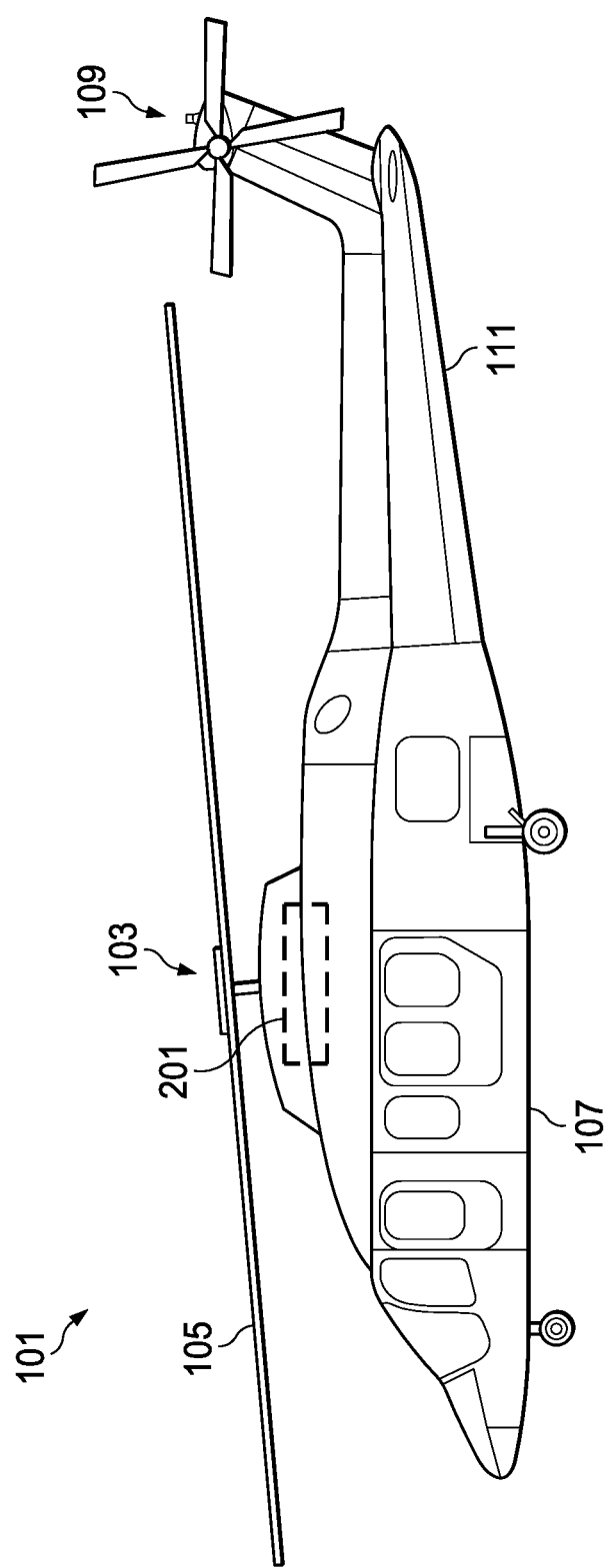
FIG. 1 shows a view of a rotorcraft having a bearing assembly according to the present disclosure.

FIG. 1 shows a schematic diagram of an example rotorcraft 101, which constitutes an example of an aircraft as discussed in this disclosure. Alternative aircraft for purposes of this disclosure can also include tiltrotor aircraft. Rotorcraft 101 has a rotor system 103 with multiple rotor blades 105. The pitch of each rotor blade 105 can be manipulated in order to selectively control direction, thrust, and lift of rotorcraft 101. Rotorcraft 101 can further include a fuselage 107, anti-torque system 109, and an empennage 111. The rotorcraft 101 also includes a transmission 201 for transferring power from one or more rotorcraft engines (not shown) to the rotor system 103. The transmission 201 can also be configured to transfer power from one or more rotorcraft engines to the anti-torque system 109 and other accessories during normal flight conditions. The transmission 201 can also be configured to reduce engine output rpm to optimum rotor rpm. The transmission 201 can also be configured to change the axis of rotation. For example, the rotorcraft 101 can include horizontally mounted engines, in which case the transmission 201 can be configured to change the axis of rotation from the horizontal axis of the engines to the vertical axis of the rotor system 103.

Figure 2:
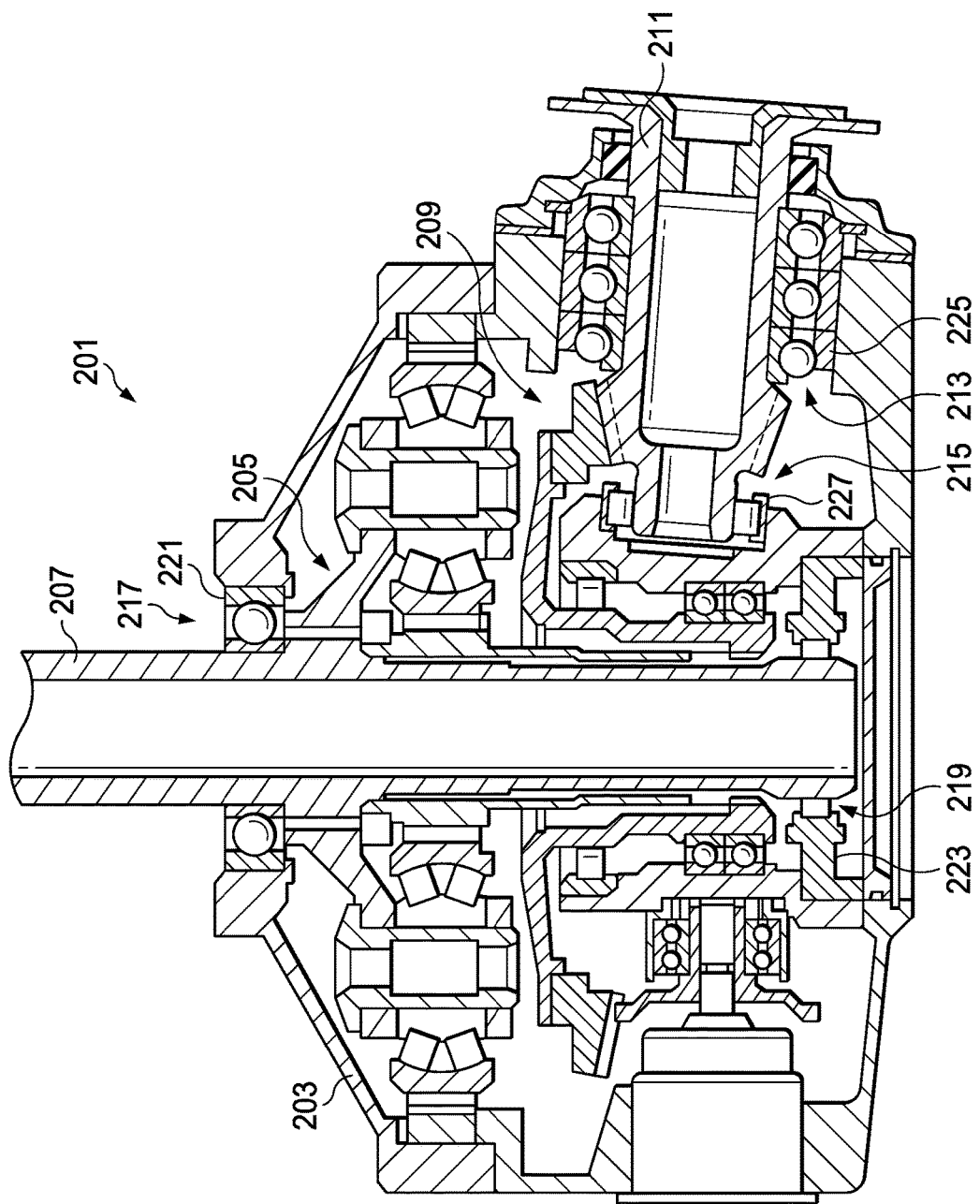
FIG. 2 shows cross-sectional view of an aircraft transmission.

FIG. 2 shows an exemplary illustration of a transmission 201. The transmission 201 includes a plurality of bearing assemblies to support various moving and/or rotating members.

As shown in FIG. 2, transmission 201 includes a housing 203 including a first receiving portion 205 configured to receive a main rotor shaft 207 and a second receiving portion 209 configured to receive a spiral bevel input pinion 211. The spiral bevel input pinion 211 is supported by bearing assemblies 213 and 215. The transmission 201 also includes bearing assemblies 217 and 219 that support the main rotor shaft 207. A main drive shaft (not shown) transfers power from an engine (not shown) to the transmission 201 via the spiral bevel input pinion 211. The main rotor shaft 207 carries power from the transmission 201 to the rotor blades 105.

The transmission 201 also includes a plurality of bearing liners for serving as a wear-resisting layer between the various bearings and their respective support housings. For example, as shown in FIG. 2, bearing liners 221 and 223 are arranged between the bearing assemblies 217 and 219 and the bearing support housing 203. The bearing assemblies 217 and 219 support the main rotor shaft 207 of the rotorcraft 101. Liners 225 and 227 are arranged between the bearing assemblies 213 and 215 and the housing 203 respectively. The bearings assemblies 213 and 215 support the spiral bevel input pinion 211 of the rotorcraft 101.

The various bearings in the transmission 201 can comprise fully or partially ceramic bearings, for example formed of silicon nitride ($Si_3N_4$). In order to accommodate ceramic bearings, the transmission 201 preferably includes apparatus for detecting ceramic debris. Also, many ceramic materials, such as silicon nitride, have a relatively low coefficient of thermal expansion. For example, silicon nitride has a coefficient of thermal expansion that is about ⅓ that of steel and about ⅙ that of aluminum. This presents a difficulty in accommodating ceramic components in bearing assemblies when used in an apparatus formed of metal such as steel or aluminum. For example, it is difficult to incorporate a ceramic bearing race into an aluminum case without having either unacceptably high case stresses at low temperatures or unacceptably high radial clearing to properly position the bearing at operating temperature. Thus, in order to overcome this difficulty, the present disclosure includes a bearing liner configured to allow a ceramic bearing to be used in combination with metal housings and other components.

Figure 3:
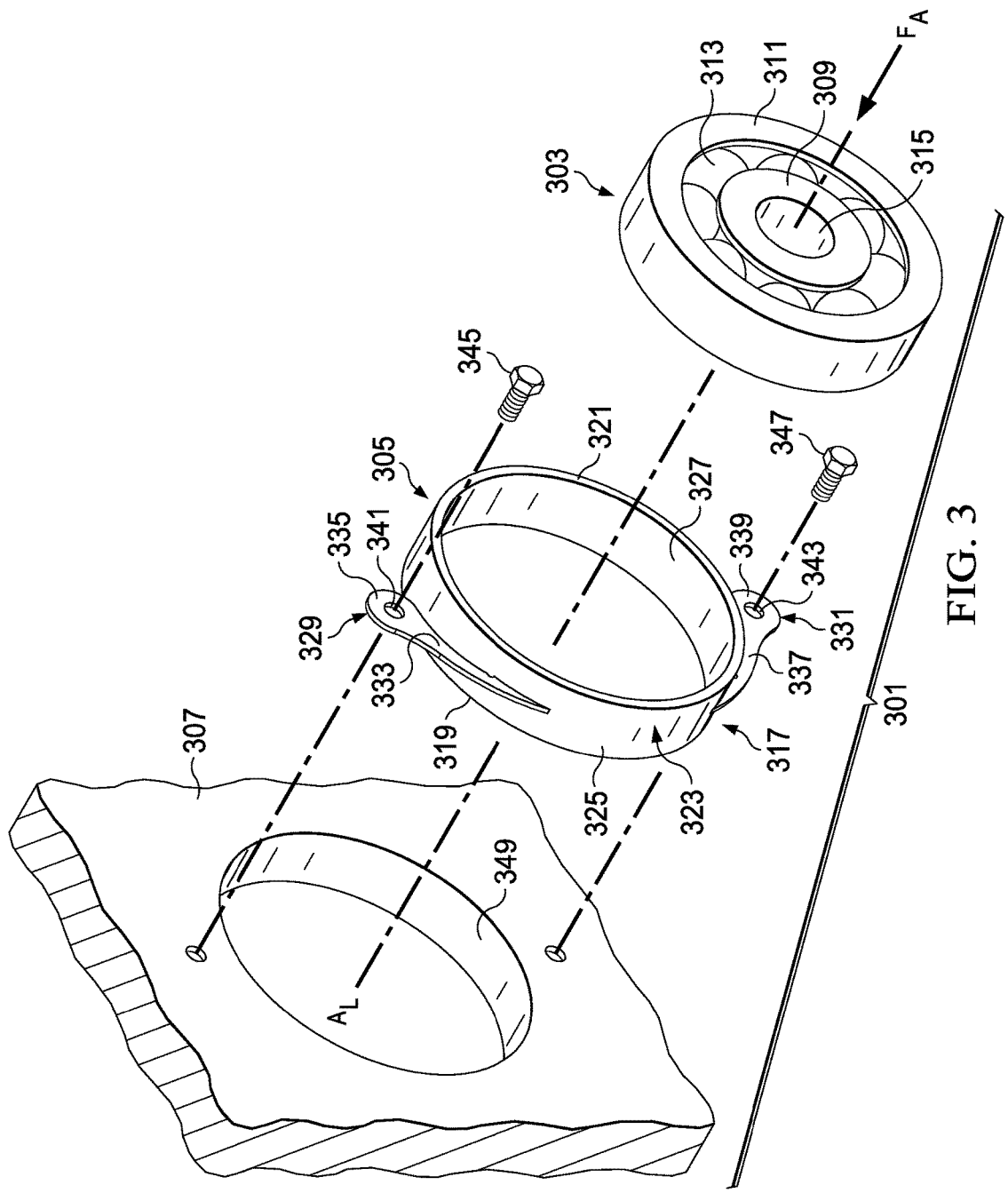
FIG. 3 shows an exploded view of an embodiment of a single-row bearing assembly.
Figure 4A:
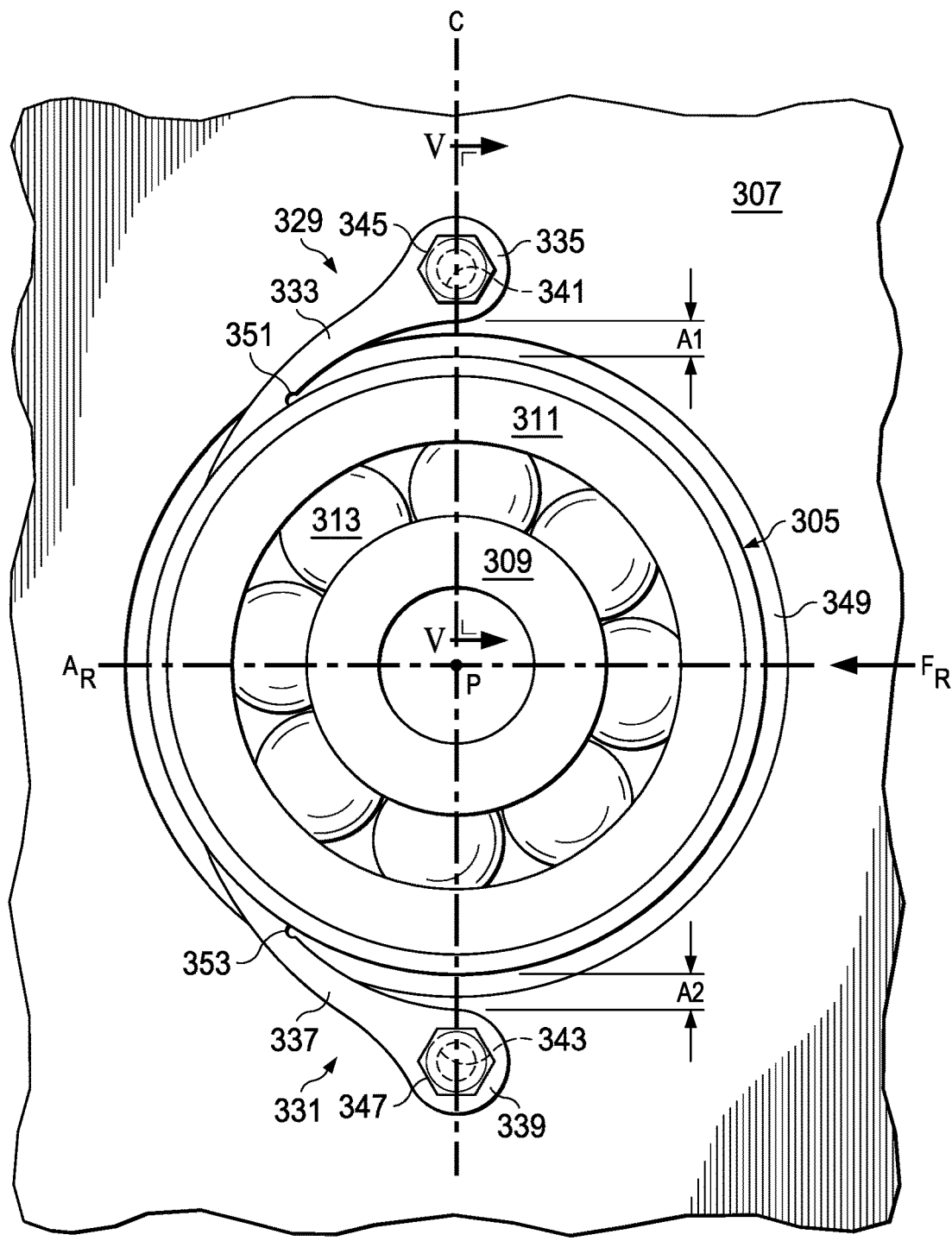
FIGS. 4A and 4B show plan views of an embodiment of a duplex bearing assembly.
Figure 4B:
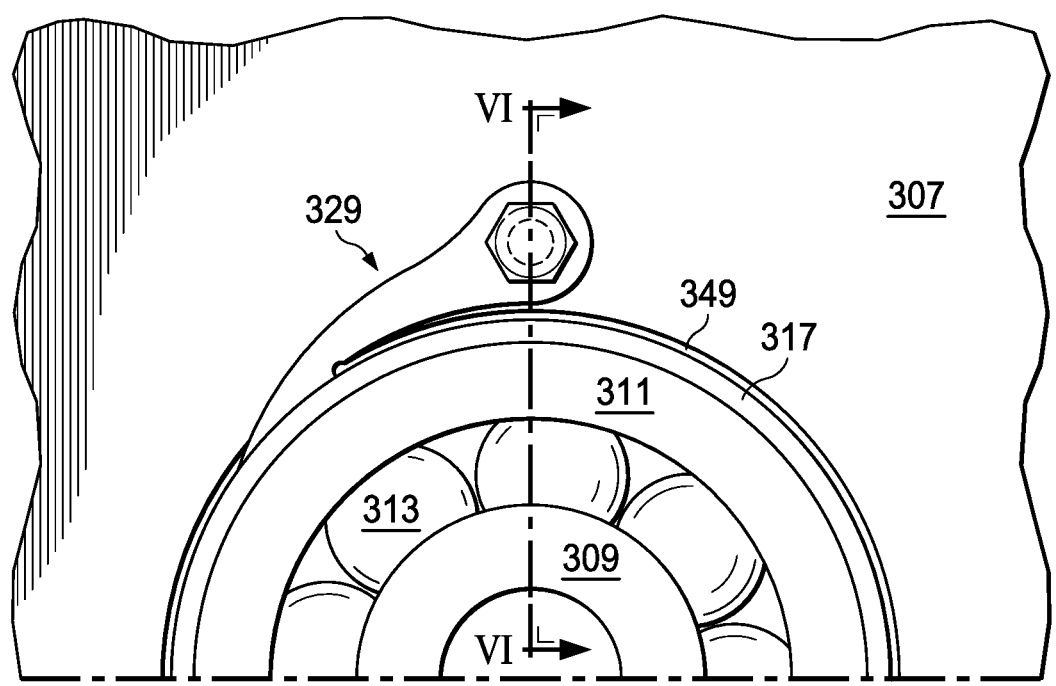

Referring next to FIGS. 3, 4A, and 4B, exemplary embodiments of a bearing assembly 301 are shown. The embodiments are similar, with the primary difference being that the embodiment shown in FIG. 3 (as well as the cross-sectional view shown in FIG. 7) includes a single bearing 303, whereas the embodiment shown in FIGS. 4A and 4B (as well as cross-sectional views in FIGS. 5 and 6) includes a duplex pair of bearings 303. FIG. 3 shows an exploded view of the bearing assembly 301. FIG. 4A shows a plan view of the bearing liner 305 installed with the pair of bearings 303 in the bearing housing 307. The bearing assembly 301 includes at least one bearing 303, a bearing liner 305, and a bearing housing 307. The bearing 303 includes an inner race 309, an outer race 311 and a plurality of ball bearings 313. The bearing 303 further includes a cylindrical bore 315 for receiving a rotating shaft. While bearing 303 has been illustrated as having ball bearings 313 it should be appreciated that other types of bearings can be used such as roller bearings, or the like.

The bearing liner 305 is preferably formed of a material, for example invar, with a thermal expansion rate similar to that of the bearing material. The bearing liner 305 includes a cylindrical body portion 317, a first mounting tab 329, and a second mounting tab 331. The body portion 317 includes a first side 319, a second side 321, and a cylindrical substrate 323 extending therebetween. The cylindrical substrate 323 includes an outer surface 325 and an inner surface 327 opposite the outer surface 325.

The first mounting tab 329 and the second mounting tab 331 together constitute an embodiment of a mounting portion of the bearing liner 305. The mounting tabs 329 and 331 allow the bearing liner 305 to be fixed to the bearing housing 307. While two mounting tabs are shown, alternatively embodiments can include additional mounting tabs or only a single mounting tab. Also, while mounting tabs are shown as having arcuate shapes, alternative embodiments can include various other shapes for the mounting tabs. In the illustrated embodiment, the first mounting tab 329 and the second mounting tab 331 both extend from the body portion 317 of the bearing liner 305. In the illustrated embodiment, the first mounting tab 329 and second mounting tab 331 both extend from the outer surface 325 of the body portion 317. Preferably, the first mounting tab 329 and second mounting tab 331 both extend from respective locations on the outer surface 325 of the body portion 317 that are substantially centered between the first side 319 and the second side 321 of the body portion 317. Alternatively, one or both of the first and second mounting tabs 329 and 331 can extend from the second side 321 of the body portion 317.

The first mounting tab 329 includes a first arm portion 333 and a first mounting portion 335. The first arm portion 333 extends between the first mounting portion 335 and the body portion 317 of the bearing liner 305. Similarly, the second mounting tab 331 includes a second arm portion 337 and a second mounting portion 339. The second arm portion 337 extends between the second mounting portion 339 and the body portion 317 of the bearing liner 305. The first and second mounting tabs 329 and 331 are substantially flat and each have upper and lower surfaces that are substantially orthogonal to the outer and inner surfaces 325 and 327 of the cylindrical body portion 317.

As shown in FIG. 4A, a center line C can be defined that extends through center point P of the bearing 303. The center line C lies on the plane normal to the axial load direction $F_A$ (shown in FIG. 3) of the bearing 303 and is orthogonal to the radial load direction $F_R$ (shown in FIG. 4A) on the bearing 303. The axial load direction $F_A$ is parallel to the longitudinal axis $A_L$ (shown in FIG. 3) of a shaft that extends through the bearing 303, such as the main rotor shaft 207 or the spiral bevel input pinion 211 in the transmission 201 shown in FIG. 2. Thus, the axial load direction $F_A$ is parallel to the central rotational axis $A_L$ of the bearing 303 and the radial load direction $F_R$ is parallel to a radial axis $A_R$ (shown in FIG. 4A) that extends through center point P and is orthogonal to both center line C and longitudinal axis $A_L$.

The center line C bisects the bearing liner 305 so as to define two semi-circular halves of the body portion 317 of the bearing liner 305. In the illustrated embodiment, the first mounting tab 329 and second mounting tab 331 both extend in opposite directions from the same half of the body portion 317 defined by the center line C in FIG. 4A. The first mounting portion 335 defines a mounting hole 341 and the second mounting portion 339 defines a second mounting hole 343. As shown in FIG. 4A, the first and second mounting holes 341 and 343 are both bisected by the center line C to reduce or eliminate induced moments into the bearing liner 305 as thermal expansion and contraction of the bearing housing 307 occurs. Also, the first arm portion 333 and the second arm portion 337 preferably extend from positions on the body portion 317 that are substantially equally distant from the radial axis $A_R$. The mounting holes 341 and 343 allow the bearing liner 305 to be fixed to the bearing housing 307 using mounting hardware, such as screws or bolts 345 and 347.

The bearing liner 305 is configured to be attached to the bearing housing 307 using hardware 345 and 347 such that the cylindrical body portion 317 extends at least partially through a cylindrical bore 349 defined by the bearing housing 307. However, as discussed above, thermal expansion and contraction of the bearing housing 307 does not match thermal expansion and contraction of the bearing 303 because of the use of a ceramic bearing 305 with a metallic bearing housing 307. Therefore, the mounting tabs 329 and 331 in combination with mounting hardware, such as screws or bolts 345 and 347, allow the bearing liner 305 to remain fixed to the bearing housing 307 even while a gap exists between the bore 349 of the bearing housing 307 and the cylindrical body portion 317 of the bearing liner 305.

Figure 6:
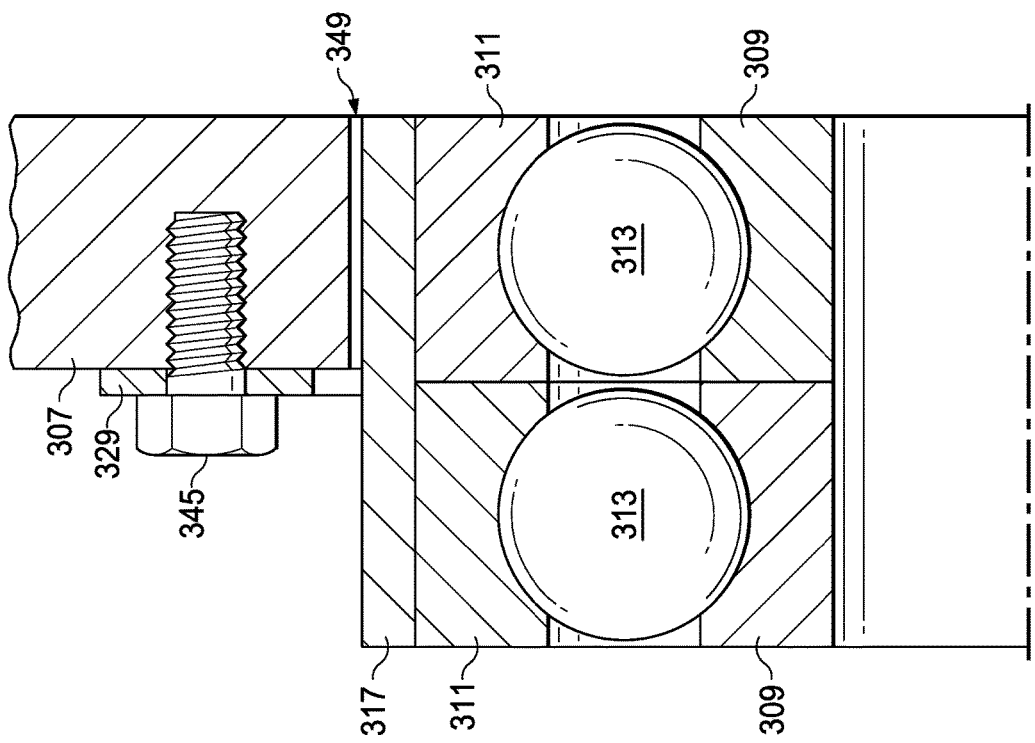
FIG. 6 shows a cross-sectional view of the bearing assembly taken along section line VI-VI shown in FIG. 4B.
Figure 5:
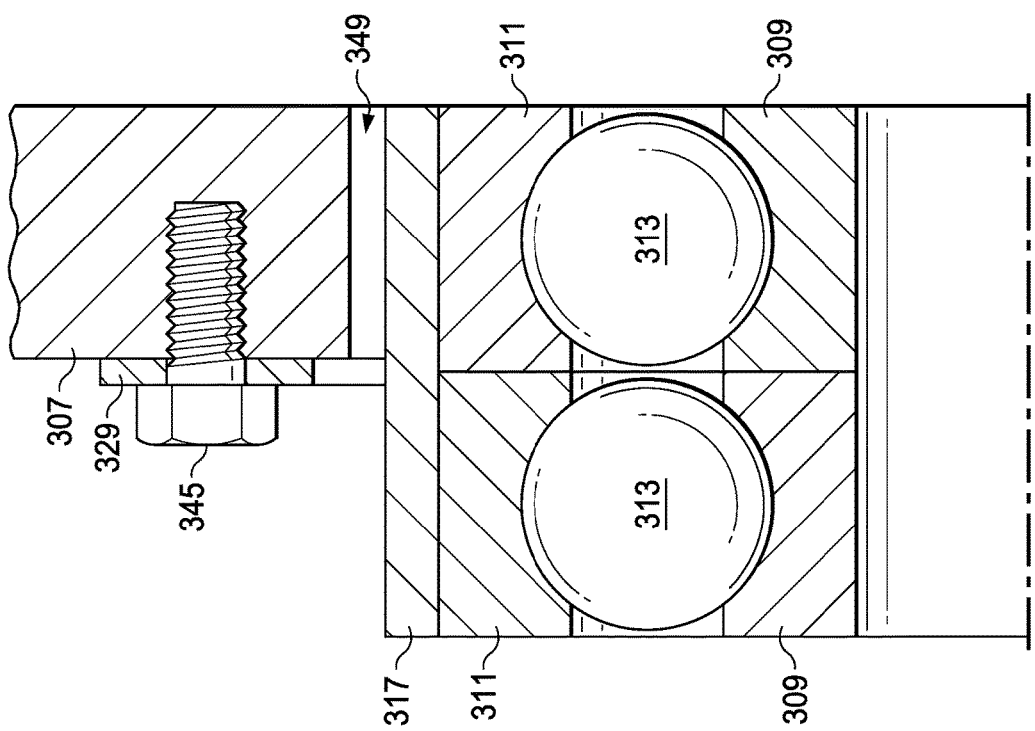
FIG. 5 shows a cross-sectional view of an embodiment of a duplex bearing assembly taken along section line V-V shown in FIG. 4A.

FIG. 4A shows a view of the bearing assembly 301 while a relatively large gap exists between the bore 349 of the bearing housing 307 and the cylindrical body portion 317 of the bearing liner 305. FIG. 4B shows a view of a portion of the bearing assembly 301 shown in FIG. 4A while a relatively small gap exists between the bore 349 of the bearing housing 307 and the cylindrical body portion 317 of the bearing liner 305. FIG. 5 shows a cross-sectional view taken along section line V-V in FIG. 4A. FIG. 6 shows a cross-sectional view taken along section line VI-VI in FIG. 4B. The first and second mounting tabs 329 and 331 are configured to flex relative to the body portion 317 as indicated by arrows A1 and A2 in FIG. 4A. For example, as shown in FIGS. 4 and 4A, the first mounting tab 329 can move relative the cylindrical body portion 317.

In FIG. 4A, where the gap between the bore 349 and the cylindrical body portion 317 is relatively large, the distance between the first mounting portion 335 and the cylindrical body portion 317 is also relatively large compared to the view shown in FIG. 4B where the gap is relatively smaller. Also, the first and second mounting tabs 329 and 331 are configured to flex relative to the body portion 317 as indicated by arrows A1 and A2 in FIG. 4A. The second mounting tab 329 can similarly move relative to the body portion 317. In order to accommodate the movement of the first and second mounting tabs 329 and 331 relative to the body portion 317, the transition region between the body portion 317 and the first mounting tab 329 defines a first stress relief radius 351 and the transition region between the body portion 317 and the second mounting tab 331 defines a second stress relief radius 353. The first and second stress relief radii 351 and 353 help to prevent binding or cracking of the material at the transition regions between the body portion 317 and the first and second mounting tabs 329 and 331.

Figure 7:
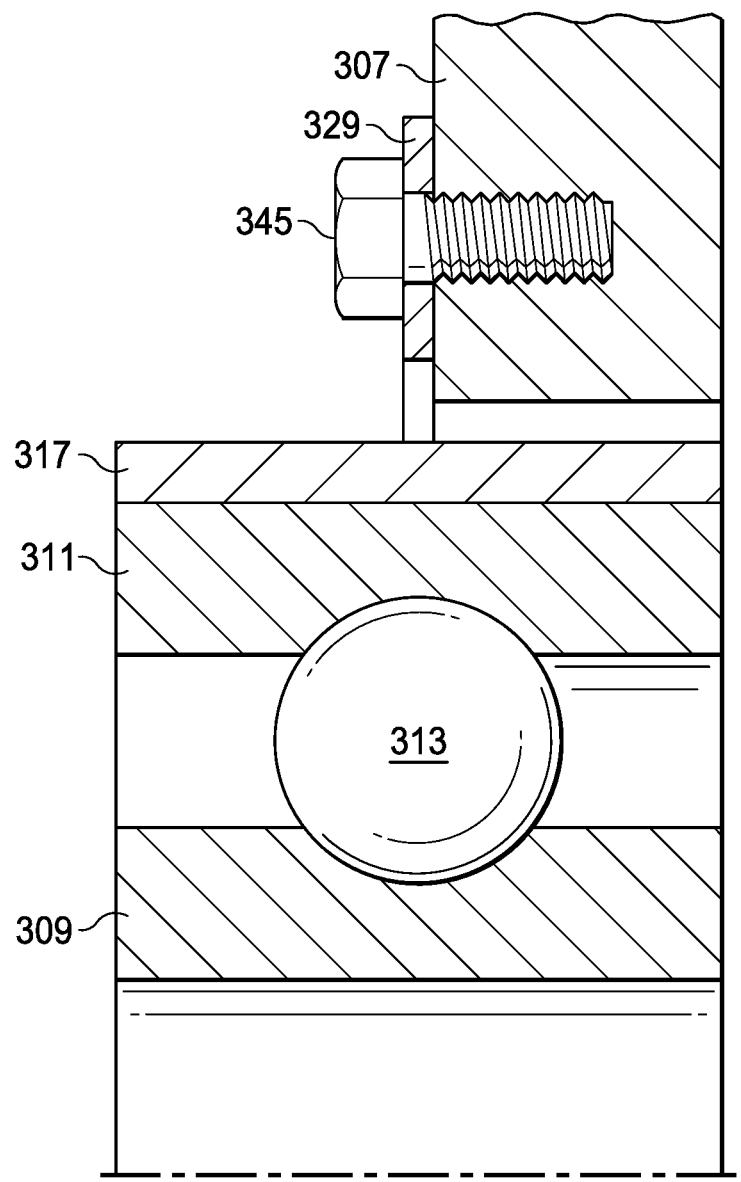
FIG. 7 shows a cross-sectional view of an embodiment of a single-row bearing assembly.

As described above, the first mounting tab 329 and second mounting tab 331 both extend from respective locations on the outer surface 325 of the body portion 317 that are substantially centered between the first side 319 and the second side 321 of the body portion 317. In embodiments such as shown in FIGS. 5 and 6, the first mounting tab 329 and second mounting tab 331 are therefore substantially centered between the two bearings 303. FIG. 7 shows a cross-sectional view similar to the view shown in FIG. 5, but for an embodiment having a single bearing 303. FIG. 7 shows that, alternatively, the first mounting tab 329 and second mounting tab 331 are substantially centered on the bearing 303 in a single-bearing 303 embodiment.

Referring again to FIG. 3, the bearing assembly 301 can be assembled from the exploded view shown in FIG. 3 to the assembled plan view shown in FIG. 4A. Bearing liner 305 is inserted in the inner diameter of bore 349 of the bearing housing 307. The bearing liner 305 is fixed to the bearing housing 307 using mounting hardware, such as screws or bolts 345 and 347 to fix the first and second mounting tabs 329 and 331 to the housing 307. Alternative attachment methods or apparatus can be used to fix the first and second mounting tabs 329 and 331 to the housing 307, including the use of adhesive instead of or in combination with mounting hardware. The bearing 303 is inserted within bearing liner 305. The bearing 303 can be press-fit into the bearing liner 305 and/or adhered to the bearing liner 305 using an adhesive so as to be held in place relative to the bearing liner 305. In alternative embodiments, the cylindrical body portion 317 can instead be formed to have an arcuate cross-section that forms a convex arc with respect to bearing 303 so as to grip outer race 311 and help secure the bearing 303 in place relative to the bearing liner 305.

The bearing liner 305 disclosed herein minimizes compression of the bearing 305 as the bore 349 of the bearing housing 307 contracts at cold temperatures. The bearing liner 305 also maintains the position of the bearing 305 relative to the bearing housing 307 and maintains the fit of the bearing 305 in the bore 349 at high operating temperatures. The bearing liner 305 isolates the housing 307 from high temperatures by reduced expansion that creates an air gap between the bearing housing 307 and the bearing 303, which reduces thermal conductivity therebetween. Finally, the bearing liner 305 provides stiff support in the radial load direction and compliant support in other directions.

While various embodiments in accordance with the principles disclosed herein have been described above, it should be understood that they have been presented by way of example only, and are not limiting. Thus, the breadth and scope of the claims should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages. Also, the phrases "at least one of A, B, and C" and "A and/or B and/or C" should each be interpreted to include only A, only B, only C, or any combination of A, B, and C.

What is claimed is:

1. A bearing liner comprising:
   a body portion having a cylindrical substrate that extends about a longitudinal axis, the cylindrical substrate having an inner surface and an outer surface, and the cylindrical substrate extending between first and second sides thereof;
   a first mounting tab comprising a first arm portion extending from the body portion to a first mounting portion; and
   a second mounting tab comprising a second arm portion extending from the body portion to a second mounting portion,
   wherein a center line of the body portion, based on a longitudinal end view of the body portion, is orthogonal to the longitudinal axis and extends through the first and second mounting portions,
   wherein the first and second arm portions comprise arcuate members extending in an arc from an attachment location on a side of the center line to the first mounting portion and the second mounting portion, respectively, the attachment locations of each arm portion being located on a same side of the center line of the body portion, and
   wherein at least one of the first and second mounting tabs can flex relative to the body portion so as to allow for thermally-induced movement of the first and second mounting portions relative to the body portion.

2. The bearing liner of claim 1, wherein the first arm portion extends from the body portion at a first transition region that defines a first stress relief radius, and wherein the second arm portion extends from the body portion at a second transition region that defines a second stress relief radius.

3. The bearing liner of claim 2, wherein the first and second transition regions are on a same side of the center line of the body portion.

4. The bearing liner of claim 1, wherein the first and second mounting portions define respective first and second mounting holes.

5. The bearing liner of claim 4, wherein the first and second mounting holes are aligned along the center line of the body portion.

6. A bearing assembly comprising:
   a bearing housing defining a bore;
   a bearing configured to allow for rotation about a longitudinal axis, the bearing being supported by the bearing housing; and
   a bearing liner supported by the bearing housing, the bearing liner comprising:
     a body portion having a cylindrical substrate that extends between the bearing housing and the bearing, the cylindrical substrate having an inner surface and an outer surface, and the cylindrical substrate extending between first and second sides thereof;
     a first mounting tab comprising a first arm portion extending from the body portion to a first mounting portion; and
     a second mounting tab comprising a second arm portion extending from the body portion to a second mounting portion,
   wherein a center line of the body portion, based on a longitudinal end view of the body portion, is orthogonal to the longitudinal axis and extends through the first and second mounting portions,
   wherein the first and second arm portions comprise arcuate members extending in an arc from an attachment location on a side of the center line to the first mounting portion and the second mounting portion, respectively, the attachment locations of each arm portion being located on a same side of the center line of the body portion, and wherein at least one of the first and second mounting tabs can flex relative to the body portion so as to allow for thermal expansion and contraction of the bearing housing relative to the bearing liner.

7. The bearing assembly of claim 6, wherein the first arm portion extends from the body portion at a first transition region that defines a first stress relief radius, and wherein the second arm portion extends from the body portion at a second transition region that defines a second stress relief radius.

8. The bearing assembly of claim 7, wherein the first and second transition regions are on a same side of the center line of the body portion.

9. The bearing assembly of claim 6, wherein the first and second mounting portions define respective first and second mounting holes.

10. The bearing assembly of claim 9, wherein the first and second mounting holes are aligned along the center line of the body portion.

11. An aircraft comprising:
a rotor assembly comprising a rotor shaft; and
a transmission for driving the rotor shaft, the transmission comprising a bearing assembly, the bearing assembly comprising:
a bearing housing defining a bore;
a bearing configured to allow for rotation about a longitudinal axis, the bearing being supported by the bearing housing; and
a bearing liner supported by the bearing housing, the bearing liner comprising:
a body portion having a cylindrical substrate that extends between the bearing housing and the bearing, the cylindrical substrate having an inner surface and an outer surface, and the cylindrical substrate extending between first and second sides thereof;
a first mounting tab comprising a first arm portion extending from the body portion to a first mounting portion; and
a second mounting tab comprising a second arm portion extending from the body portion to a second mounting portion,
wherein a center line of the body portion, based on a longitudinal end view of the body portion, is orthogonal to the longitudinal axis and extends through the first and second mounting portions,
wherein the first and second arm portions comprise arcuate members extending in an arc from an attachment location on a side of the center line to the first mounting portion and the second mounting portion, respectively, the attachment locations of each arm portion being located on a same side of the center line of the body portion, and
wherein at least one of the first and second mounting tabs can flex relative to the body portion so as to allow for thermal expansion and contraction of the bearing housing relative to the bearing liner.

12. The aircraft of claim 11, wherein the first arm portion extends from the body portion at a first transition region that defines a first stress relief radius, and wherein the second arm portion extends from the body portion at a second transition region that defines a second stress relief radius.

13. The aircraft of claim 12, wherein the first and second transition regions are on a same side of the center line of the body portion.

14. The aircraft of claim 11, wherein the first and second mounting portions define respective first and second mounting holes, wherein the first and second mounting holes are aligned along the center line of the body portion.

* * * * *